United States Patent
Sekizuka

(10) Patent No.: US 11,066,038 B2
(45) Date of Patent: Jul. 20, 2021

(54) OCCUPANT PROTECTION SYSTEM

(71) Applicant: TOYOTA JIDOSHA KABUSHIKI KAISHA, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/568,522

(22) Filed: Sep. 12, 2019

(65) Prior Publication Data

US 2020/0122676 A1 Apr. 23, 2020

(30) Foreign Application Priority Data

Oct. 17, 2018 (JP) .............................. JP2018-196107

(51) Int. Cl.
*B60R 21/233* (2006.01)
*B60R 21/239* (2006.01)
*B60R 21/00* (2006.01)

(52) U.S. Cl.
CPC .......... *B60R 21/233* (2013.01); *B60R 21/239* (2013.01); *B60R 2021/0011* (2013.01); *B60R 2021/0048* (2013.01); *B60R 2021/23324* (2013.01)

(58) Field of Classification Search
CPC ................ B60R 21/233; B60R 21/239; B60R 2021/0011
See application file for complete search history.

(56) References Cited

U.S. PATENT DOCUMENTS

| 6,004,084 | A | | 12/1999 | Moker | |
|---|---|---|---|---|---|
| 6,113,132 | A | * | 9/2000 | Saslecov | B60R 21/20 280/730.1 |
| 7,364,185 | B2 | * | 4/2008 | Mori | B60N 2/42745 280/730.1 |
| 8,235,418 | B2 | * | 8/2012 | Slaats | B60R 21/232 280/743.2 |
| 10,632,956 | B2 | * | 4/2020 | Schneider | B60R 21/231 |
| 10,640,075 | B2 | * | 5/2020 | Chen | B60R 21/214 |
| 10,730,473 | B2 | * | 8/2020 | Hayashi | B60R 21/2338 |

(Continued)

FOREIGN PATENT DOCUMENTS

| DE | 19533375 A1 | 3/1997 |
|---|---|---|
| DE | 102016216329 A1 | 3/2018 |

(Continued)

OTHER PUBLICATIONS

U.S. Appl. No. 16/525,694, filed Jul. 30, 2019 in the name of Kazuya Mori et al.

*Primary Examiner* — Faye M Fleming
(74) *Attorney, Agent, or Firm* — Oliff PLC

(57) ABSTRACT

An occupant protection system includes a seat disposed such that a rear surface of a seatback in a seat front-rear direction faces a wall portion of a vehicle cabin; an airbag provided in the wall portion or the seatback and configured to support the seatback by inflating and deploying between the wall portion and the seatback; and an inflator configured to generate gas to be supplied to the airbag in a case where a collision that causes an occupant seated in the seat to inertially move rearward in the seat front-rear direction is detected or predicted. The airbag has a vent hole through which the gas inside the airbag is discharged outside.

9 Claims, 10 Drawing Sheets

(56) References Cited

U.S. PATENT DOCUMENTS

| | | | |
|---|---|---|---|
| 10,882,487 B2* | 1/2021 | White | B60N 2/14 |
| 2006/0055153 A1* | 3/2006 | Hirata | B60R 21/233 |
| | | | 280/728.1 |
| 2015/0069741 A1 | 3/2015 | Shimazu | |
| 2019/0016294 A1 | 1/2019 | Hayashi | |
| 2019/0111880 A1 | 4/2019 | Choi | |
| 2019/0118758 A1* | 4/2019 | Arima | B60R 21/205 |
| 2019/0241145 A1* | 8/2019 | Hiruta | B60R 21/2342 |
| 2020/0317153 A1* | 10/2020 | Shen | B60R 21/2338 |

FOREIGN PATENT DOCUMENTS

| | | |
|---|---|---|
| DE | 102017221976 A1 | 4/2019 |
| EP | 1634778 A1 | 3/2006 |
| JP | 2008-222154 A | 9/2008 |
| JP | 2010-155574 A | 7/2010 |
| JP | 2015-051744 A | 3/2015 |
| JP | 2018-134976 A | 8/2018 |
| JP | 2019-018598 A | 2/2019 |

* cited by examiner

OCCUPANT PROTECTION SYSTEM

INCORPORATION BY REFERENCE

The disclosure of Japanese Patent Application No. 2018-196107 filed on Oct. 17, 2018 including the specification, drawings and abstract is incorporated herein by reference in its entirety.

BACKGROUND

1. Technical Field

The disclosure relates to an occupant protection system.

2. Description of Related Art

Japanese Unexamined Patent Application Publication No. 2008-222154 (JP 2008-222154 A) describes an occupant protection system configured such that an airbag is disposed on a rear side of an upper part of a seatback in a rear seat. The occupant protection system is configured such that, when the airbag inflates and deploys between the seatback and a headrest at the time of a collision at the rear side in the vehicle front-rear direction, a resistance is given to displacement of the headrest toward the rear side in the vehicle front-rear direction.

SUMMARY

The occupant protection system in JP 2008-222154 A is provided to protect the head of an occupant by the headrest at the time of a collision at the rear side in the vehicle front-rear direction and no consideration is given to reducing an impact to the chest. Further, in order to deal with a whiplash injury evaluation carried out for collision assessment in various countries, the occupant protection system is targeted for a case where a vehicle has a minor rear collision particularly in a direction from straight behind the vehicle, that is, a collision direction is a direction from straight behind the vehicle. Therefore, no consideration is given to protecting the head in a case where the collision direction is an oblique direction with respect to the vehicle and the head of the occupant moves away from the headrest.

The disclosure provides an occupant protection system configured to reduce an impact received by an occupant in case of a collision that causes the occupant to inertially move rearward in the seat front-rear direction.

An occupant protection system according to one aspect of the disclosure includes a seat disposed such that a rear surface of a seatback in a seat front-rear direction faces a wall portion of a vehicle cabin; an airbag provided in the wall portion or the seatback and configured to support the seatback by inflating and deploying between the wall portion and the seatback; and an inflator configured to generate gas to be supplied to the airbag in a case where a collision that causes an occupant seated in the seat to inertially move rearward in the seat front-rear direction is detected or predicted. The airbag has a vent hole through which the gas inside the airbag is discharged outside.

In the occupant protection system according to the above aspect, in a case where a collision that causes an occupant seated in the seat to inertially move rearward in the seat front-rear direction is detected or predicted, the airbag inflates and deploys between the wall portion of the vehicle cabin and the seatback. Here, "a collision that causes an occupant seated in the seat to inertially move rearward in the seat front-rear direction" indicates a collision at the front side in the vehicle front-rear direction in the case of a vehicle including a seat provided such that an occupant faces rearward, or a collision at the rear side in the vehicle front-rear direction in the case of a vehicle including a seat provided such that an occupant faces forward. At the time of the collision, the airbag supports the occupant via the seatback. Here, the vent hole is provided in the airbag so as to restrain the internal pressure of the airbag from becoming excessively large due to the gas. As a result, the collision of the vehicle is ended without applying an excessive load to the chest of the occupant. That is, with the occupant protection system of the above aspect, an impact to the chest of the occupant is reduced in case of a collision that causes the occupant to inertially move rearward in the seat front-rear direction.

In the occupant protection system according to the above aspect, the airbag may inflate and deploy in an area of the seatback, the area corresponding to a chest of the occupant; and the airbag may inflate and deploy outwardly in a seat width direction beyond a headrest of the seat at a time when the occupant moves maximally.

In the occupant protection system having the above-described configuration, the airbag inflates and deploys so as to protrude outwardly in the seat width direction from the headrest. That is, with the occupant protection system, even in a case where the vehicle has a collision in an oblique direction (i.e., an object (e.g., another vehicle) obliquely collides with the vehicle) and the head of the occupant cannot be supported by the headrest at the time when the occupant moves maximally, an impact to the head can be reduced by the airbag.

In the occupant protection system according to the above aspect, the vent hole may be provided on a side face of the airbag in a seat width direction so as to be disposed between the seat and a windshield at a time when the occupant moves maximally.

In the occupant protection system having the above-described configuration, the vent hole is not closed even at the time when the airbag inflates and deploys and the occupant moves maximally. Accordingly, with the occupant protection system, it is possible to secure a function to reduce the impact received by the occupant.

In the occupant protection system according to the above aspect, the airbag may include a seat deployment portion configured to support the seat including the seatback; an upper deployment portion connected to an upper side of the seat deployment portion in a seat up-down direction and having the vent hole, the upper deployment portion being configured to inflate and deploy in an area above a head of the occupant in the seat up-down direction; a partition wall configured to separate the seat deployment portion from the upper deployment portion; and a check valve provided in the partition wall and configured to permit only a flow of the gas from the seat deployment portion to the upper deployment portion.

The occupant protection system having the above-described configuration includes the upper deployment portion configured to inflate and deploy in the area above the head of the occupant in the seat up-down direction, in addition to the seat deployment portion configured to support the seatback. In the occupant protection system, in a case where the gas is continuously supplied from the inflator or in a case where the seat deployment portion is compressed by the seatback that pivots rearward in the seat front-rear direction upon receipt of a load from the occupant, the upper deployment portion inflates and deploys due to the gas flowing into the upper deployment portion from the check valve. Further, the upper deployment portion has the vent hole, and thus, the internal pressure of the airbag is restrained from becoming excessively large due to the gas. As a result, the upper deployment portion can restrain the head of the occupant without causing an excessive load to be applied to the head of the occupant. With the occupant protection system having the above-described configuration, even in a case where the vehicle has a collision at the front side in the vehicle front-rear direction in a state where the occupant does not wear a seatbelt by any chance, it is possible to protect the head of the occupant even after the occupant rebounds.

In the occupant protection system according to the above aspect, the partition wall may be provided so as to be disposed between the seat and a windshield at a time when the seat deployment portion inflates and deploys.

In the occupant protection system having the above-described configuration, the check valve provided in the partition wall is not closed even at the time when the seat deployment portion inflates and deploys, thereby making it possible to secure a function to reduce the impact received by the occupant.

In the occupant protection system according to the above aspect, the vent hole may be provided on a side face of the upper deployment portion in a seat width direction so as to be disposed between the head and a windshield at a time when the occupant moves maximally.

With the occupant protection system having the above-described configuration, the vent hole is not closed even at the time when the occupant moves maximally, thereby making it possible to secure a function to protect the head of the occupant.

In the occupant protection system according to the above aspect, the inflator and the airbag before inflating and deploying may be stored inside the seatback.

In the occupant protection system having the above-described configuration, the airbag is provided in the seatback, and therefore, even in a case where the vehicle has a collision in an oblique direction and the seatback moves obliquely rearward in the seat front-rear direction, the airbag can support the seatback.

In the occupant protection system according to the above aspect, the inflator and the airbag before inflating and deploying may be stored inside the wall portion.

In the occupant protection system having the above-described configuration, the airbag and the inflator are eliminated from the seatback, and accordingly, the weight of the seat can be reduced. Therefore, it is possible to reduce a load input into the wall portion from the seat.

According to the aspect of the disclosure, it is possible to reduce an impact received by an occupant in case of a collision that causes the occupant to inertially move rearward in the seat front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following will describe an occupant protection system according to each embodiment with reference to the drawings. Note that, in each figure, an arrow FR indicates the front side in the vehicle front-rear direction, an arrow UP indicates the upper side in the vehicle up-down direction, and an arrow RH indicates the right side in the vehicle width direction. Note that, in each embodiment, based on a front seat, the rear side in the seat front-rear direction corresponds to the front side in the vehicle front-rear direction, the upper side in the seat up-down direction corresponds to the upper side in the vehicle up-down direction, and the left side in the seat width direction corresponds to the right side in the vehicle width direction.

Figure 1:
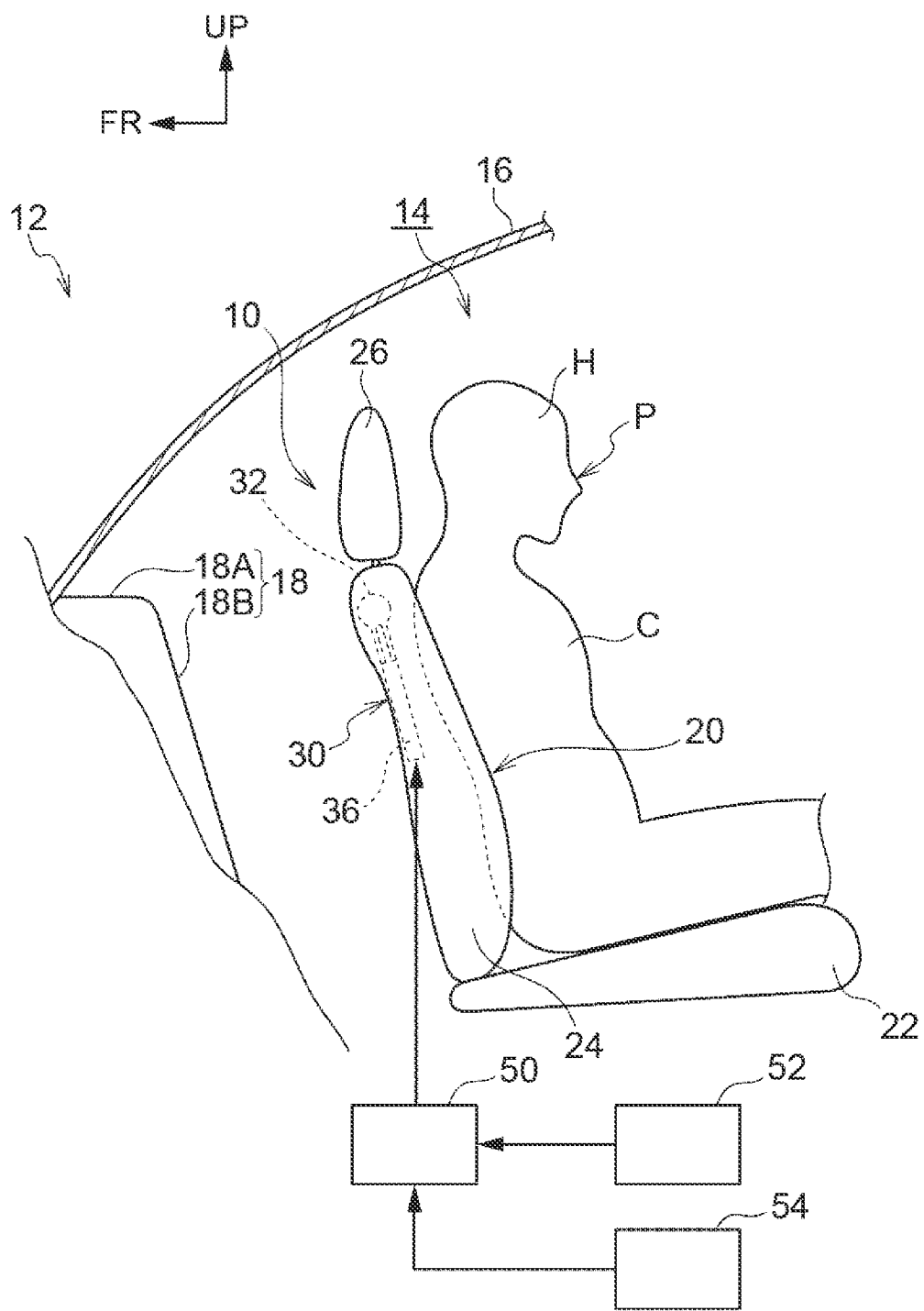
FIG. 1 is a side view of a vehicle and illustrates the arrangement of an occupant protection system according to first and second embodiments.

The configuration of a first embodiment will be described. FIG. 1 illustrates a vehicle 12 to which an occupant protection system 10 according to the present embodiment is applied. The vehicle 12 of the present embodiment is an autonomous vehicle and does not require a driver during autonomous driving. As illustrated in FIG. 1, a front windshield glass (hereinafter just referred to as "windshield") 16 as a windshield and a dashboard 18 are disposed in the front side, in the vehicle front-rear direction, of a vehicle cabin 14 of the vehicle 12. The windshield 16 is disposed between a pair of pillars (not shown) provided in the vehicle width direction. The windshield 16 is inclined downward in the vehicle up-down direction toward the front side in the vehicle front-rear direction. The dashboard 18 includes an upper wall portion 18A extending toward the rear side in the vehicle front-rear direction along the vehicle front-rear direction from the vicinity of a bottom end of the windshield 16, and a rear wall portion 18B that is a wall portion inclined downward in the vehicle up-down direction toward the rear side in the vehicle front-rear direction from a rear end of the upper wall portion 18A in the vehicle front-rear direction.

Further, the vehicle cabin 14 is provided with a front seat 20 that is a seat facing rearward in the vehicle front-rear direction so as to face a rear seat (not shown) facing forward in the vehicle front-rear direction. In the present embodiment, in a case where an occupant P getting in the vehicle 12 is seated in the front seat 20, the occupant P thus seated in the front seat 20 faces rearward in the vehicle front-rear direction.

The occupant protection system 10 of the present embodiment includes the front seat 20 and an airbag device 30.

The front seat 20 includes a seat cushion 22 that allows the occupant P to be seated thereon by supporting the thighs and the buttocks of the occupant P, a seatback 24 that can support the back of the occupant P, and a headrest 26 that can support the head H of the occupant P.

The seat cushion 22 includes a cushion material made of urethane foam, and a covering material made of cloth or leather and covering the surface of the cushion material. The seat cushion 22 is formed to be slidable in the vehicle front-rear direction via a seat rail (not shown). Note that the seat cushion 22 may be formed to be rotatable around an axis extending along the vehicle up-down direction.

Figure 2:
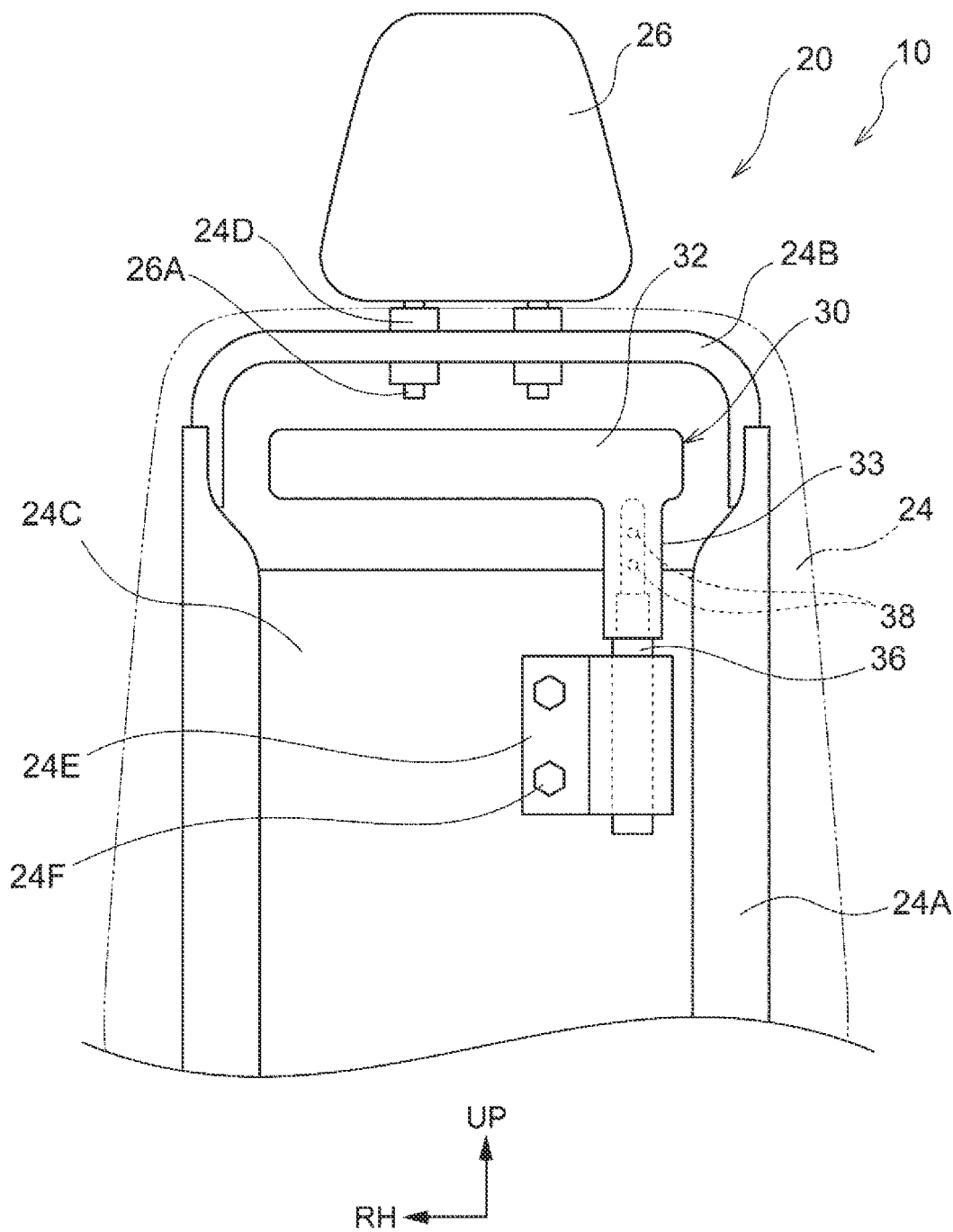
FIG. 2 is a rear view of a front seat and illustrates a state where a rear airbag and an inflator are stored in the occupant protection system according to the first and second embodiments.

As illustrated in FIG. 2, the seatback 24 includes a pair of right and left side frames 24A provided so as to extend in the height direction, and an upper frame 24B connected to respective upper end portions of the side frames 24A in the seat up-down direction so as to extend in the seat width direction. Further, the seatback 24 includes a cushion material provided for the side frames 24A and the upper frame 24B and made of urethane foam, and a covering material made of cloth or leather and covering the surface of the cushion material. Further, lower end portions of the side frames 24A in the seat up-down direction are pivotally supported in the vicinity of a rear end portion of the seat cushion 22 in the seat front-rear direction, so that the seatback 24 is formed to be pivotable in the seat front-rear direction (see an arrow R in FIG. 4A). The seatback 24 of the present embodiment is disposed so that a rear surface of the seatback 24 in the seat front-rear direction faces the rear wall portion 18B that is a wall portion of the vehicle cabin 14.

A plate-shaped back panel 24C is connected to rear surfaces of the side frames 24A in the seat front-rear direction. The airbag device 30 is fixed to the back panel 24C. Further, a pair of right and left holders 24D is connected to the vicinity of the center of the upper frame 24B in the seat width direction. The holder 24D is formed into a cylindrical shape, and a headrest stay 26A (described below) is inserted into the holder 24D.

A headrest 26 is provided in an upper end portion of the seatback 24 in the seat up-down direction. The headrest 26 includes a cushion material made of urethane foam, and a covering material made of cloth or leather and covering the surface of the cushion material. Further, the headrest 26 includes the pair of right and left headrest stays 26A extending downward in the seat up-down direction. When the headrest stays 26A are inserted into the holders 24D provided in the upper end portion of the seatback 24 in the seat up-down direction, respectively, the headrest 26 is fixed so as to be slidable in the seat up-down direction relative to the seatback 24.

As illustrated in FIG. 1, the airbag device 30 includes a rear airbag 32 as an airbag, an inflator 36 configured to supply gas to the rear airbag 32, and an electronic control unit (ECU) 50 configured to control the operation of the inflator 36. The airbag device 30 is configured to support the seatback 24 of the front seat 20 that pivots rearward in the seat front-rear direction (forward in the vehicle front-rear direction) when the vehicle 12 has a collision at the front side in the vehicle front-rear direction (i.e., when an object (e.g., another vehicle) collides with the front side of the vehicle 12 in the vehicle front-rear direction). As illustrated in FIG. 2, the rear airbag 32 and the inflator 36 are stored inside the seatback 24.

Figure 3A:
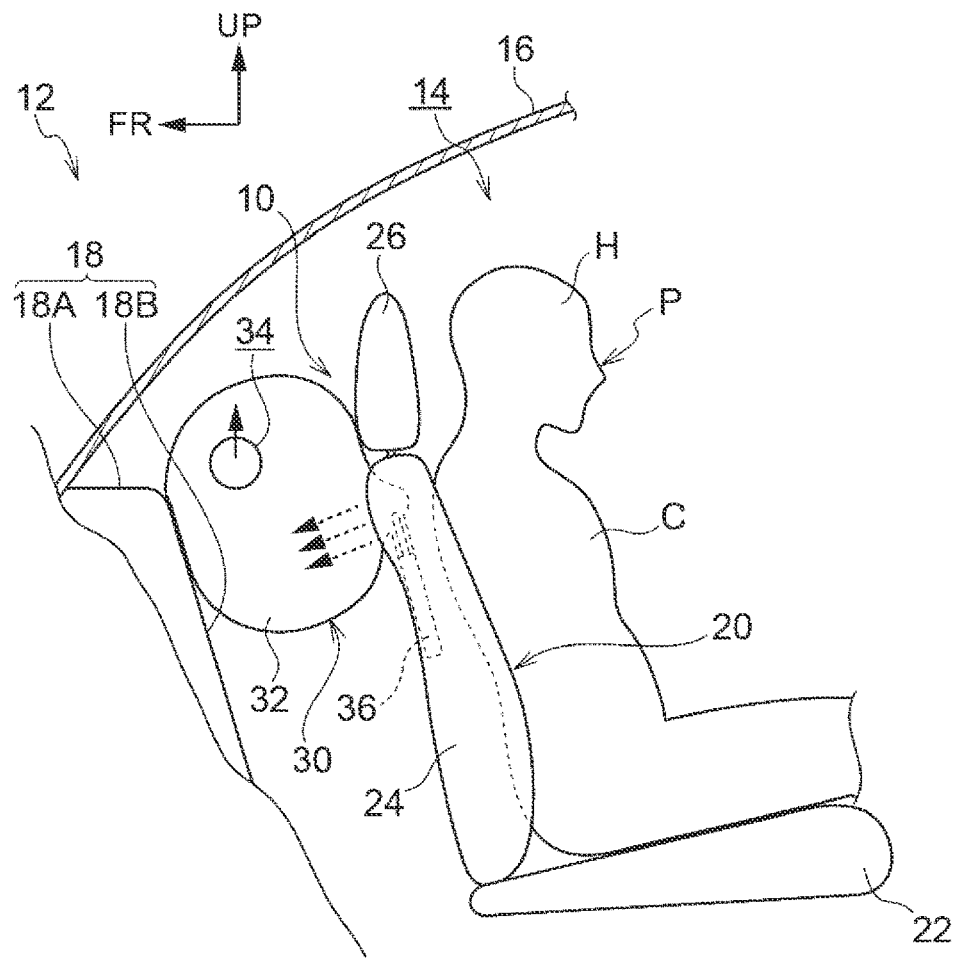
FIG. 3A is a side view of a vehicle in a state where the rear airbag is inflating and deploying in the occupant protection system according to the first embodiment.
Figure 4A:
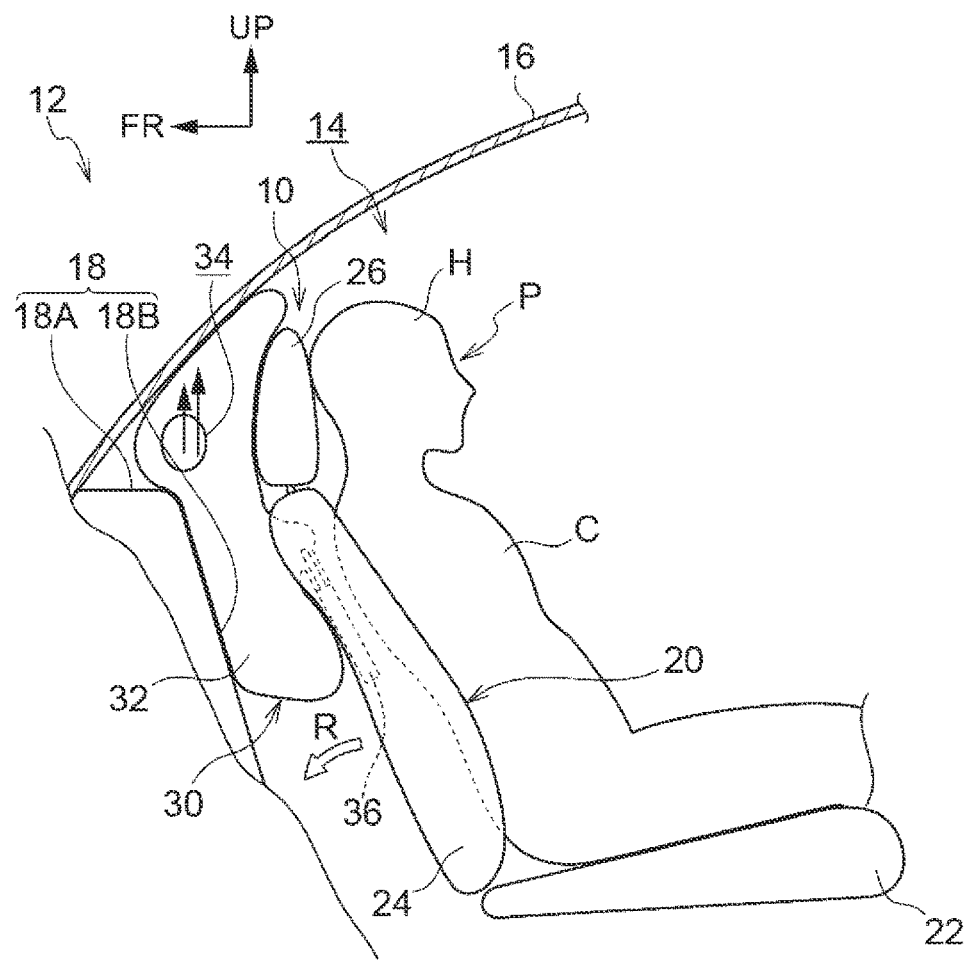
FIG. 4A is a side view of the vehicle in a state after the rear airbag has inflated and deployed in the occupant protection system according to the first embodiment.

As illustrated in FIGS. 3A and 4A, the rear airbag 32 of the present embodiment inflates and deploys between the rear wall portion 18B and the seatback 24. The rear airbag 32 is formed in a bag shape by overlapping two sheets of base cloth made of a nylon or polyester fabric material, and sewing them together. The rear airbag 32 inflates and deploys in an area in the seatback 24, the area corresponding to the chest C of the occupant P (see FIGS. 4A and 4B). Further, in a front view of the front seat 20, the rear airbag 32 inflates and deploys outwardly in the seat width direction beyond the headrest 26 at the time when the occupant P moves maximally (see FIG. 4B).

As illustrated in FIG. 2, the rear airbag 32 before inflating and deploying is in a folded state and is stored inside the seatback 24. The rear airbag 32 is stored in a reverse L-shape in a rear view.

When the airbag device 30 of the present embodiment operates, the rear airbag 32 inflates and deploys from the seatback 24 toward the rear wall portion 18B (see FIG. 3A). When the rear airbag 32 reaches the rear wall portion 18B, the rear airbag 32 further inflates and deploys toward the lower side of the seatback 24 in the seat up-down direction and toward an area above the headrest 26 in the seat up-down direction (see FIG. 4A), and the rear airbag 32 also inflates and deploys outwardly in the seat width direction (see FIGS. 3B, 4B). In the present embodiment, as illustrated in FIG. 4A, the rear airbag 32 inflates and deploys between the rear wall portion 18B and the seatback 24, and thus, the rear airbag 32 supports the seatback 24 and the headrest 26 that pivot rearward (an arrow-R direction) in the seat front-rear direction upon receipt of a load from the occupant.

Further, as illustrated in FIGS. 3A and 4A, vent holes 34 are provided in the rear airbag 32. Each of the vent holes 34 is a round hole through which gas inside the rear airbag 32 is discharged outside. The vent hole 34 is provided in each side face (a surface on each side in the seat width direction) of the rear airbag 32. Further, in a side view, the vent hole 34 is provided so as to be disposed between the front seat 20 and the windshield 16 at the time when the occupant P moves maximally.

The inflator 36 is configured to generate gas to be supplied to the rear airbag 32 in a case where a collision that causes the occupant P seated in the front seat 20 to inertially move rearward in the seat front-rear direction is detected or predicted. In the present embodiment, a case where the vehicle 12 has a collision at the front side in the vehicle front-rear direction corresponds to a case where "a collision that causes the occupant P to inertially move rearward is detected." Further, a case where the vehicle 12 is likely to have a collision at the front side in the vehicle front-rear direction corresponds to a case where "a collision that causes the occupant P to inertially move rearward is predicted." As illustrated in FIG. 2, the inflator 36 of the present embodiment is formed in a substantially cylindrical shape with its longitudinal direction extending along the seat up-down direction. Here, in the seatback 24, a plate-shaped holding plate 24E is fixed to the back panel 24C with bolts 24F, and the inflator 36 is sandwiched between the back panel 24C and the holding plate 24E so as to be fixed to the seatback 24.

In the present embodiment, a cylindrical extending portion 33 extends downward in the seat up-down direction from a right end portion of the rear airbag 32 in the seat width direction, and the upper side of the inflator 36 in the seat up-down direction is inserted into the extending portion 33. Further, a gas injection portion 38 including a plurality of holes is formed in an insertion part of the inflator 36, which is inserted into the extending portion 33. As illustrated in FIG. 1, the ECU 50 is electrically connected to the inflator 36.

The ECU 50 is configured to control the operation of the inflator 36. The ECU 50 is electrically connected to a collision prediction sensor 52 such as a pre-collision sensor or an in-vehicle camera that is configured to predict a collision. Further, the ECU 50 is electrically connected to a collision sensor 54 configured to detect a collision. When a front end collision of the vehicle 12 is detected or predicted based on a signal from at least one of the collision prediction sensor 52 and the collision sensor 54, the ECU 50 operates the inflator 36.

Note that, in the above configuration, the volume of the rear airbag 32, the diameter of the vent hole 34, the amount of gas to be supplied from the inflator 36, and so on are adjusted in a range where the seatback 24 does not hit the rear wall portion 18B at the time when the occupant P moves maximally.

Next, the operation of the occupant protection system 10 of the present embodiment will be described.

As illustrated in FIG. 1, the rear airbag 32 before inflating and deploying is stored inside the seatback 24, and the seatback 24 is distanced from the dashboard 18.

Here, in a case where the collision prediction sensor 52 predicts a collision, the collision prediction sensor 52 outputs a signal to the ECU 50. Further, in a case where the collision sensor 54 detects a collision, the collision sensor 54 outputs a signal to the ECU 50. When the ECU 50 receives the signal from at least one of the collision prediction sensor 52 and the collision sensor 54, the ECU 50 outputs a signal to the inflator 36.

When the inflator 36 receives the signal from the ECU 50, an ignition agent provided inside the inflator 36 is ignited. Thus, gas is generated inside the inflator 36, and the gas is emitted from the gas injection portion 38.

As illustrated in FIG. 3A, the gas emitted from the gas injection portion 38 is supplied into the rear airbag 32. The rear airbag 32 starting inflating splits a tear line (not shown) as a fragile portion provided on the rear side of the seatback 24 in the seat front-rear direction, and thus, the rear airbag 32 inflates and deploys in an area behind the seatback 24 in the seat front-rear direction. Then, the rear airbag 32 makes contact with the rear wall portion 18B of the dashboard 18.

Further, when the rear airbag 32 inflates and deploys, the vent hole 34 closed in the rear airbag 32 folded before inflating and deploying appears on the side face of the rear airbag 32. The gas supplied into the rear airbag 32 is partially discharged via the vent hole 34, thereby restraining the internal pressure of the rear airbag 32 from becoming excessively large. This restrains an excessive load from being applied to the seatback 24 from the rear airbag 32.

Figure 3B:
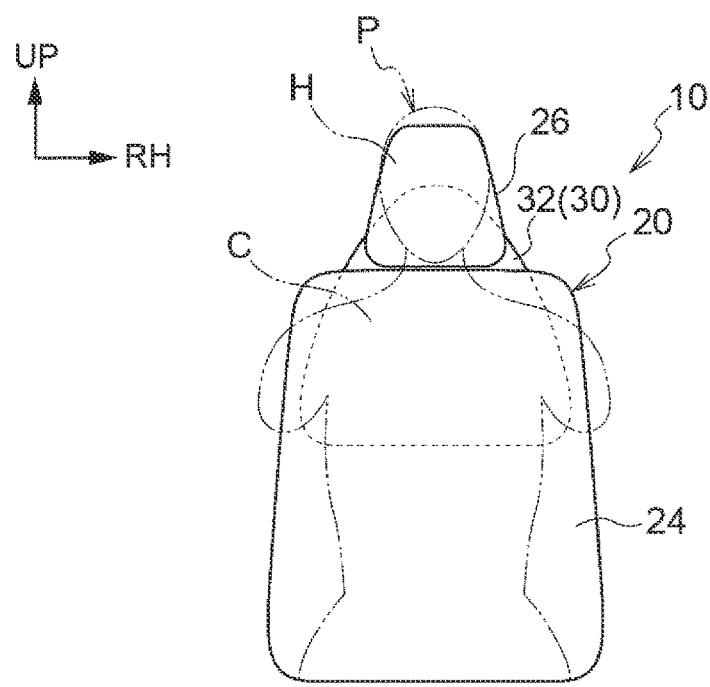
FIG. 3B is a front view of the front seat in the state where the rear airbag is inflating and deploying in the occupant protection system according to the first embodiment.

Further, as illustrated in FIG. 3B, the rear airbag 32 that is inflating and deploying has a substantially triangular shape in a front view and is positioned within a range from the substantially center of the seatback 24 in the seat up-down direction to the substantially center of the headrest 26 in the seat up-down direction.

In the meantime, as illustrated in FIG. 4A, when the gas emitted from the gas injection portion 38 is continuously supplied into the rear airbag 32, the rear airbag 32 further inflates and deploys. Further, the rear airbag 32 is compressed by the seatback 24 and the headrest 26 that pivot rearward (the arrow-R direction) in the seat front-rear direction upon receipt of a load from the occupant P. At this time, the lower side of the rear airbag 32 in the seat up-down direction is sandwiched between the seatback 24 and the rear wall portion 18B, and the upper side of the rear airbag 32 in the seat up-down direction is sandwiched between the headrest 26 and the windshield 16.

When the rear airbag 32 is compressed, the gas inside the rear airbag 32 is discharged moderately through the vent hole 34. This restrains an excessive load from being applied to the seatback 24 from the rear airbag 32. Thus, with the present embodiment, the collision of the vehicle 12 is ended without excessively applying a load to the chest C of the occupant P.

Figure 4B:
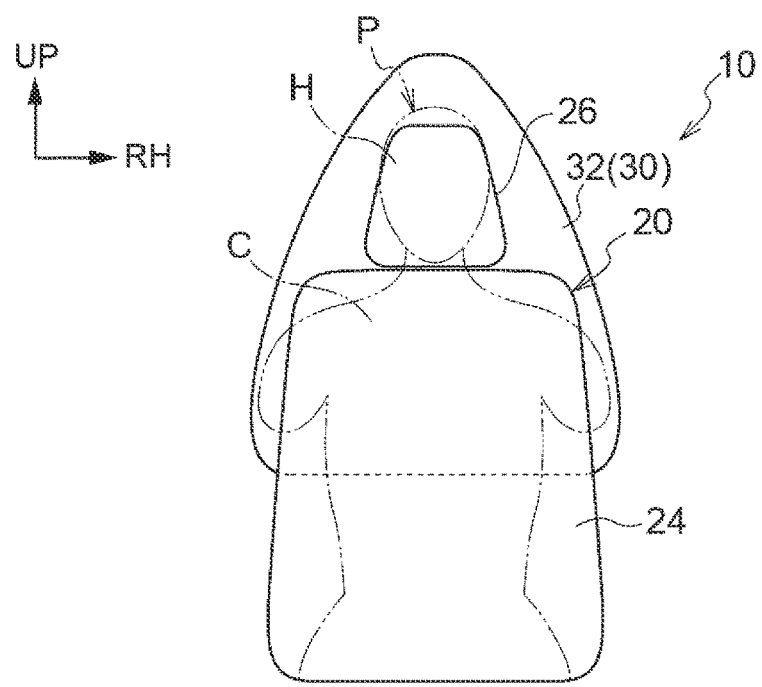
FIG. 4B is a front view of the front seat in the state after the rear airbag has inflated and deployed in the occupant protection system according to the first embodiment.

Further, as illustrated in FIG. 4B, the rear airbag 32 after inflating and deploying has a substantially triangular shape in a front view and covers a range from the substantially center of the seatback 24 in the seat up-down direction to an upper end portion of the headrest 26 in the seat up-down direction. Here, in an area of the rear airbag 32, which corresponds to the seatback 24, in other words, an area corresponding to the chest C of the occupant P, an outer part of the rear airbag 32 in the seat width direction protrudes from the seatback 24. Further, in an area of the rear airbag 32, which corresponds to the headrest 26, in other words, an area corresponding to the head H of the occupant P, the outer part of the rear airbag 32 in the seat width direction and an upper part of the rear airbag 32 in the seat up-down direction protrude from the headrest 26.

In a case where a collision between vehicles is assumed, a collision speed, which is a relative speed during the collision, is higher when another vehicle collides with the front side of a host vehicle in the vehicle front-rear direction than a collision speed when the other vehicle collides with the rear side of the host vehicle in the vehicle front-rear direction, a direction toward the front side being a traveling direction of the host vehicle, and a direction toward the rear side being opposite to the traveling direction of the host vehicle. This is because, during the collision at the front side in the vehicle front-rear direction, the travelling direction of the other vehicle is opposite to the travelling direction of the host vehicle, and during the collision at the rear side in the vehicle front-rear direction, the travelling direction of the other vehicle is the same as the travelling direction of the host vehicle. Accordingly, in a case where another vehicle collides with the front side, in the vehicle front-rear direction, of the vehicle 12 including the front seat 20 provided such that the occupant P seated thereon faces rearward as in the present embodiment, it is necessary to consider a collision speed higher than a collision speed in a test regarding the whiplash injury evaluation carried out for collision assessment in various countries. In view of this, the present embodiment employs the above configuration to deal with a high collision speed.

First, in the present embodiment, in a case where the vehicle 12 has a collision at the front side in the vehicle front-rear direction, the rear airbag 32 supports the occupant P via the seatback 24 and the headrest 26. In this case, a load is restrained from being excessively applied to the chest C of the occupant P. With the occupant protection system 10 of the present embodiment, an impact to the chest C of the occupant P is reduced in case of a collision that causes the occupant P to inertially move rearward in the seat front-rear direction.

Further, with the occupant protection system 10 of the present embodiment, it is possible to reduce the mass of the front seat 20 in comparison with a case where the seatback 24 is restrained from hitting the rear wall portion 18B by increasing the strength of the seat cushion 22 and the seatback 24. That is, it is also possible to achieve a reduction in the weight of the vehicle 12.

In the present embodiment, the rear airbag 32 inflates and deploys so as to protrude from the headrest 26, so that the following effects can be yielded. That is, with the occupant protection system 10 of the present embodiment, even in a case where the vehicle 12 has a collision in an oblique direction (i.e., an object (e.g., another vehicle) obliquely collides with the vehicle 12) and the head H of the occupant P cannot be supported by the headrest 26 at the time when the occupant P moves maximally, an impact to the head H can be reduced by the rear airbag 32.

Note that, as illustrated in FIG. 4A, in the present embodiment, the vent hole 34 is provided so as to appear between the front seat 20 (the seatback 24 and the headrest 26) and the windshield 16 even when the occupant P moves maximally. That is, it is desirable that the vent hole 34 be disposed in a part that has a sufficient length in the vehicle front-rear direction, the part being located between the rear wall portion 18B and the seatback 24. With the occupant protection system 10 of the present embodiment, the vent hole 34 is not closed even at the time when the occupant P moves maximally, thereby making it possible to secure a function to reduce the impact to the chest C and the head H of the occupant P.

Further, in the present embodiment, the airbag device 30 is provided on the seatback 24-side (i.e., the airbag device 30 is provided in the seatback 24). Accordingly, even in a case where the vehicle 12 has an oblique collision at the front side in the vehicle front-rear direction (i.e., an object (e.g., another vehicle) obliquely collides with the front side of the vehicle 12) and the seatback 24 moves obliquely rearward in the seat front-rear direction, the rear airbag 32 can support the seatback 24 and the headrest 26.

Note that the rear airbag 32 of the present embodiment supports the seatback 24 and the headrest 26 at the time of a collision, but when at least the seatback 24 can be supported, it is possible to reduce an impact to the chest C of the occupant P.

Next, a second embodiment will be described. An occupant protection system 10A of the second embodiment is different from the occupant protection system 10 of the first embodiment in the shape of the rear airbag. The following describes points different from the first embodiment. Note that the same constituent as that in the first embodiment has the same reference sign as that in the first embodiment, and its description is omitted.

Figure 5:
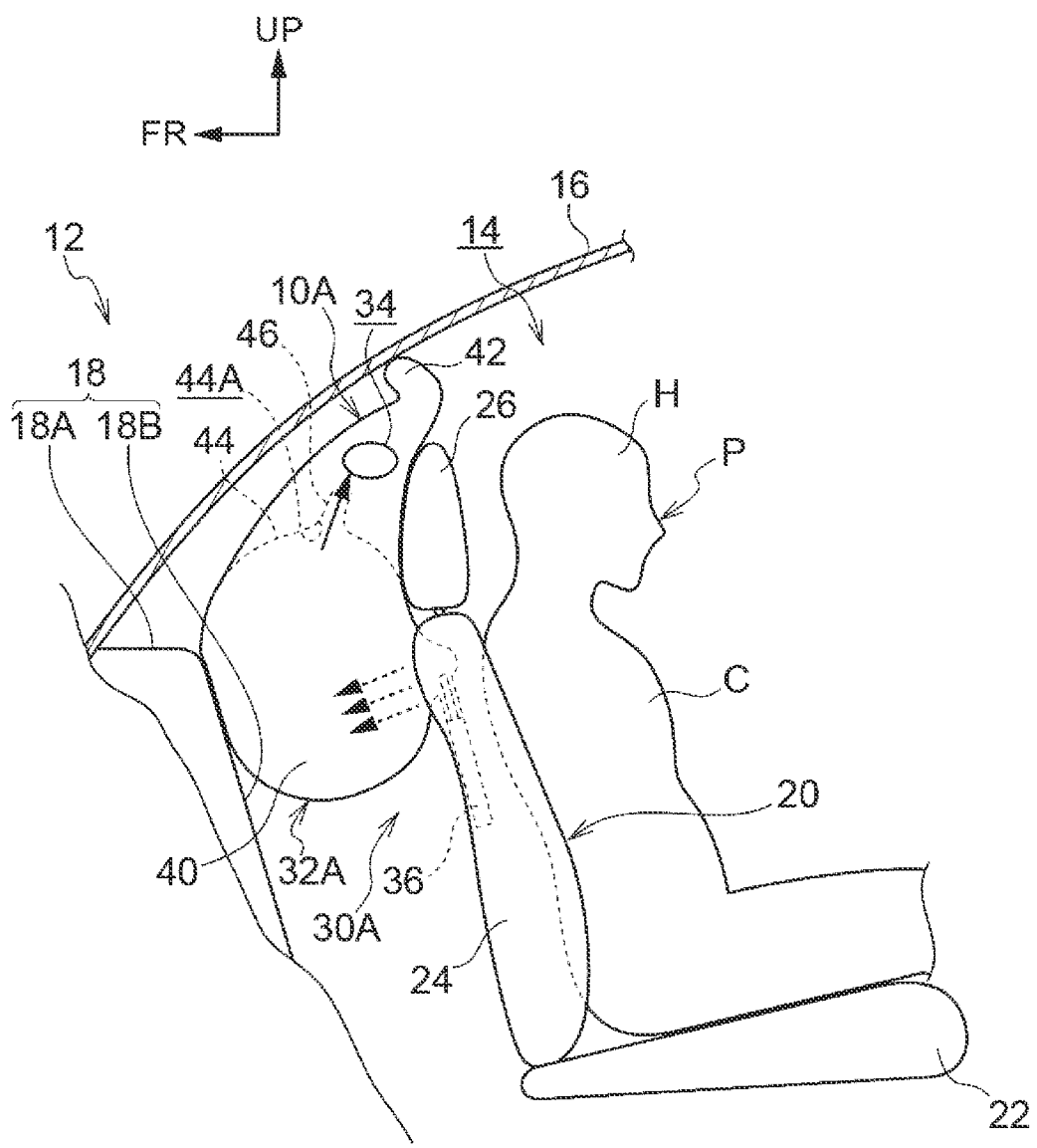
FIG. 5 is a side view of the vehicle in a state where the rear airbag is inflating and deploying in the occupant protection system according to the second embodiment.
Figure 6:
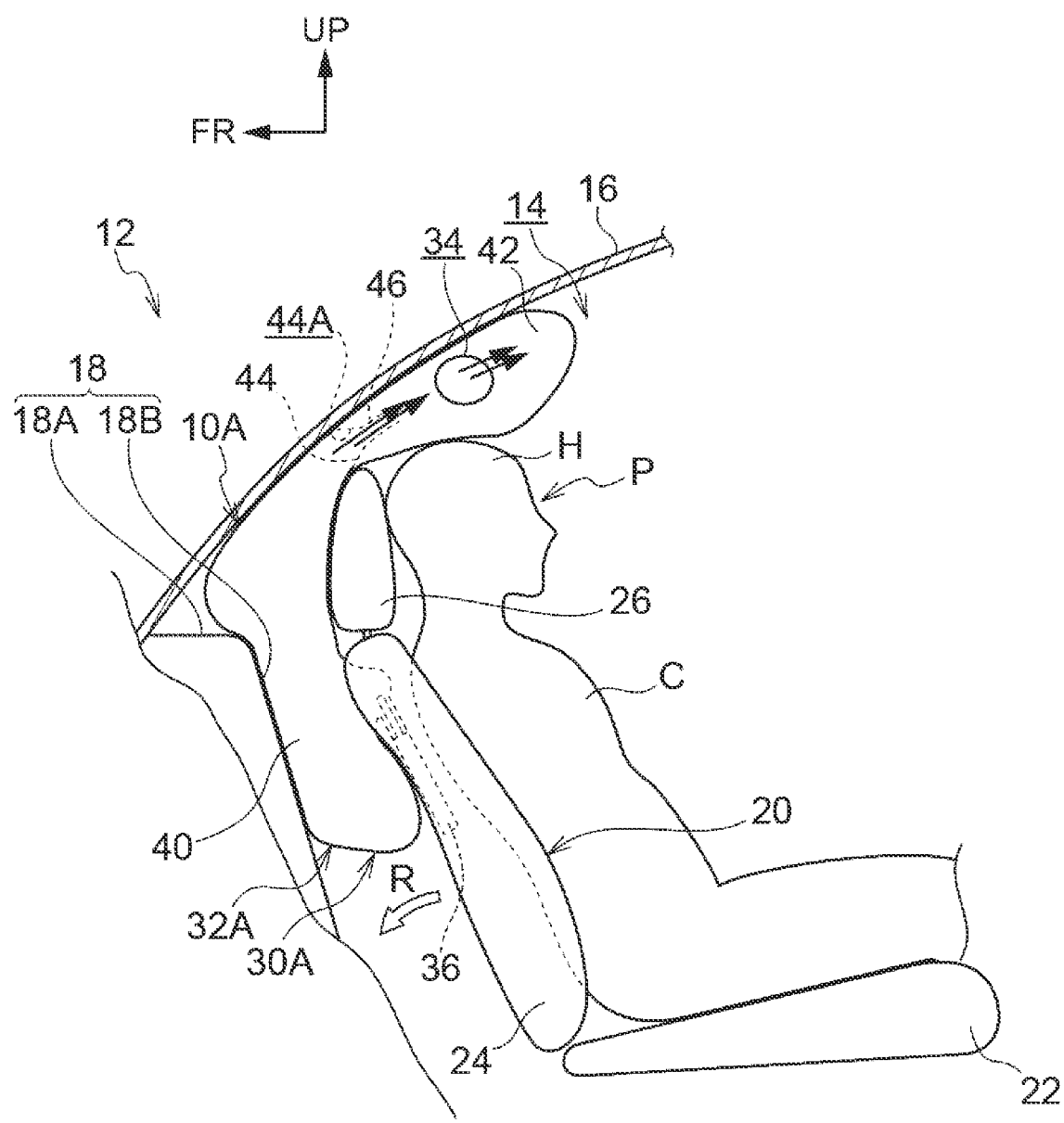
FIG. 6 is a side view of the vehicle in a state after the rear airbag has inflated and deployed in the occupant protection system according to the second embodiment.

The following describes the configuration of the second embodiment. As illustrated in FIGS. 5 and 6, an airbag device 30A of the occupant protection system 10A of the present embodiment includes a rear airbag 32A and the inflator 36. The rear airbag 32A includes a seat deployment portion 40 configured to inflate and deploy in an area behind the seatback 24 and the headrest 26 in the seat front-rear direction, and an upper deployment portion 42 configured to inflate and deploy in an area above the headrest 26 in the seat up-down direction. The upper deployment portion 42 is connected to an upper side of the seat deployment portion 40 in the seat up-down direction. The rear airbag 32A of the present embodiment is formed to have a bag shape in which the seat deployment portion 40 and the upper deployment portion 42 are integrated, by overlapping two sheets of base cloth made of a nylon or polyester fabric material, and sewing them together.

Further, a partition wall 44 configured to separate the seat deployment portion 40 from the upper deployment portion 42, and a check valve 46 provided in the partition wall 44 and configured to permit only the flow of gas from the seat deployment portion 40 to the upper deployment portion 42 are provided inside the rear airbag 32A. The partition wall 44 and the check valve 46 are made of a fabric material similar to the material of the rear airbag 32A. Further, in a side view, the partition wall 44 and the check valve 46 are provided so as to be disposed between the front seat 20 and the windshield 16 at the time when the seat deployment portion 40 inflates and deploys.

The check valve 46 is formed by sewing a fabric material formed in a cylindrical shape to a communicating opening 44A provided in the partition wall 44. Here, a first opening end of the cylindrical check valve 46 is sewn to an edge of the communicating opening 44A in the partition wall 44. Further, a second opening end of the check valve 46 projects into the upper deployment portion 42, thereby allowing the gas to flow from the seat deployment portion 40 to the upper deployment portion 42. In the meantime, the check valve 46 is configured to restrict the flow of the gas from the upper deployment portion 42 to the seat deployment portion 40 by being compressed when the internal pressure of the upper deployment portion 42 becomes higher than the internal pressure of the seat deployment portion 40. This restriction includes a case where the flow of the gas is completely stopped and a case where the flow of the gas is reduced.

In the rear airbag 32A of the present embodiment, the vent hole 34 is provided in each side face (a surface on each side in the seat width direction) of the upper deployment portion 42. Further, the vent hole 34 is provided so as to be closer to the occupant P than the headrest 26 is, and to be between the head H of the occupant P and the windshield 16 at the time when the occupant P moves maximally (see FIG. 6).

Figure 7A:
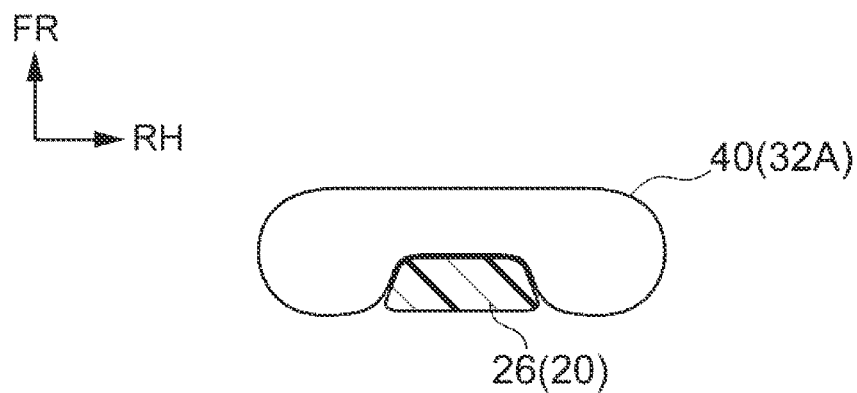
FIG. 7A is a plan sectional view taken along a line VIIA-VIIA in FIG. 7B, and illustrates the state after the rear airbag has inflated and deployed in the occupant protection system according to the second embodiment.
Figure 7B:
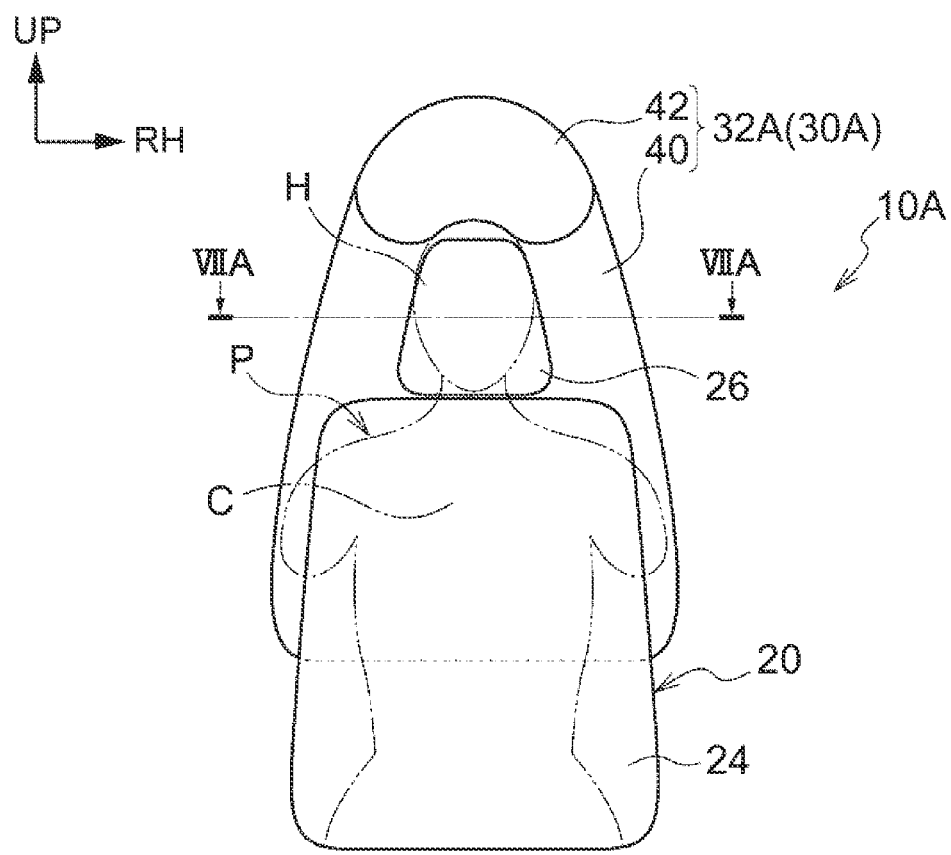
FIG. 7B is a front view of the front seat in the state after the rear airbag has inflated and deployed in the occupant protection system according to the second embodiment.

The seat deployment portion 40 of the present embodiment has substantially the same shape as that of the rear airbag 32 of the first embodiment, and the seat deployment portion 40 inflates and deploys in an area in the seatback 24, the area corresponding to the chest C of the occupant P, similarly to the rear airbag 32. That is, the seat deployment portion 40 of the present embodiment is a part of the rear airbag 32A, which supports the front seat 20 including the seatback 24. Further, as illustrated in FIGS. 7A, 7B, the seat deployment portion 40 inflates and deploys outwardly in the seat width direction beyond the headrest 26 at the time when the occupant P moves maximally.

In the meantime, as illustrated in FIG. 6, the upper deployment portion 42 inflates and deploys to reach an area ahead of the head H in the seat front-rear direction along the windshield 16 in an area above the head H in the seat up-down direction. Thus, at the time when the vehicle 12 has a collision, the upper deployment portion 42 can support the head H moving upward in the seat up-down direction.

Next, the operation of the occupant protection system 10A of the present embodiment will be described.

In the present embodiment, the rear airbag 32A before inflating and deploying is stored inside the seatback 24, and the seatback 24 is distanced from the dashboard 18, similarly to the first embodiment (see FIG. 1).

Here, in a case where the collision prediction sensor 52 predicts a collision or in a case where the collision sensor 54 detects a collision, gas is emitted from the gas injection portion 38 in the inflator 36.

As illustrated in FIG. 5, the gas emitted from the gas injection portion 38 is first supplied into the seat deployment portion 40. The seat deployment portion 40 starting inflating splits a tear line (not shown) as a fragile portion provided on the rear side of the seatback 24 in the seat front-rear direction in a side view, so that the seat deployment portion 40 inflates and deploys in the area behind the seatback 24 in the seat front-rear direction. Then, the seat deployment portion 40 makes contact with the rear wall portion 18B of the dashboard 18.

Further, when the seat deployment portion 40 inflates and deploys, the partition wall 44 and the check valve 46 folded together with the upper deployment portion 42 before inflating and deploying appear inside the rear airbag 32A. Then, the gas supplied into the seat deployment portion 40 partially flows into the upper deployment portion 42 from the check valve 46, so that the upper deployment portion 42 starts inflating.

In the present embodiment, when the gas in the seat deployment portion 40 flows into the upper deployment portion 42, the internal pressure of the seat deployment portion 40 is restrained from becoming excessively large. This restrains an excessive load from being applied to the seatback 24 from the seat deployment portion 40.

In the meantime, as illustrated in FIG. 6, in a case where the gas is continuously supplied from the inflator 36, or in a case where the seat deployment portion 40 is compressed by the seatback 24 and the headrest 26 that pivot rearward (an arrow-R direction) upon receipt of a load from the occupant P, the upper deployment portion 42 further inflates and deploys. At this time, the lower side of the seat deployment portion 40 in the seat up-down direction is sandwiched between the seatback 24 and the rear wall portion 18B, and the upper side of the seat deployment portion 40 in the seat up-down direction is sandwiched between the headrest 26 and the windshield 16. Further, the upper deployment portion 42 inflates and deploys forward from the headrest 26 in the seat front-rear direction in the area above the head H of the occupant P in the seat up-down direction, so that the upper deployment portion 42 makes contact with the windshield 16 and the head H.

The gas in the upper deployment portion 42 in which the internal pressure increases due to the contact with the windshield 16 and the head H is discharged moderately via the vent hole 34. Thus, an excessive load is not applied to the seatback 24 from the seat deployment portion 40 and an excessive load is not applied to the head H from the upper deployment portion 42. Thus, in the present embodiment, the collision of the vehicle 12 is ended without applying an excessive load to the occupant P.

In the seat deployment portion 40 of the present embodiment, similarly to the rear airbag 32 of the first embodiment, in a case where the vehicle 12 has a collision at the front side in the vehicle front-rear direction, the seat deployment portion 40 supports the occupant P via the seatback 24 and the headrest 26. In this case, an excessive load is restrained from being applied to the chest C of the occupant P. That is, with the occupant protection system 10A of the present embodiment, an impact to the chest C of the occupant P is reduced in case of a collision that causes the occupant P to inertially move rearward in the seat front-rear direction.

Further, in the present embodiment, when the upper deployment portion 42 inflates and deploys in the area above the head H of the occupant P in the seat up-down direction, the head H can be restrained by the upper deployment portion 42. Accordingly, with the occupant protection system 10A of the present embodiment, even in a case where the vehicle 12 has a collision at the front side in the vehicle front-rear direction in a state where the occupant P does not wear a seatbelt by any chance, it is possible to protect the head H of the occupant P even after the occupant P rebounds. Note that the upper deployment portion 42 is configured such that the gas inside the upper deployment portion 42 is discharged via the vent hole 34 when the head H is restrained. On this account, an excessive load is restrained from being applied to the head H from the upper deployment portion 42.

Note that, as illustrated in FIGS. 5 and 6, the partition wall 44 in the present embodiment is provided so as to be disposed between the front seat 20 (the seatback 24 and the headrest 26) and the windshield 16 at the time when the seat deployment portion 40 inflates and deploys. That is, it is desirable that the partition wall 44 be disposed to avoid an area sandwiched between the front seat 20 and the windshield 16. With the occupant protection system 10A of the present embodiment, the check valve 46 provided in the partition wall 44 is not closed even when the occupant P moves maximally, thereby making it possible to secure a function to reduce an impact to the chest C and the head H of the occupant P.

Further, the vent hole 34 of the present embodiment is provided so as to be closer to the occupant P than the headrest 26 is, and to be between the head H and the windshield 16 at the time when the occupant P moves maximally. That is, with the occupant protection system 10A of the present embodiment, the vent hole 34 is not closed even at the time when the occupant P moves maximally, thereby making it possible to secure a function to protect the head H of the occupant P.

In addition, with the occupant protection system 10A of the present embodiment, it is possible to obtain effects similar to those of the occupant protection system 10 of the first embodiment.

Next a third embodiment will be described. An occupant protection system 10B of the third embodiment is different from the occupant protection system 10 of the first embodiment in a storage space for the airbag device. The following describes points different from the first embodiment. Note that the same constituent as that in the first embodiment has the same reference sign as that in the first embodiment, and its description is omitted.

Figure 8:
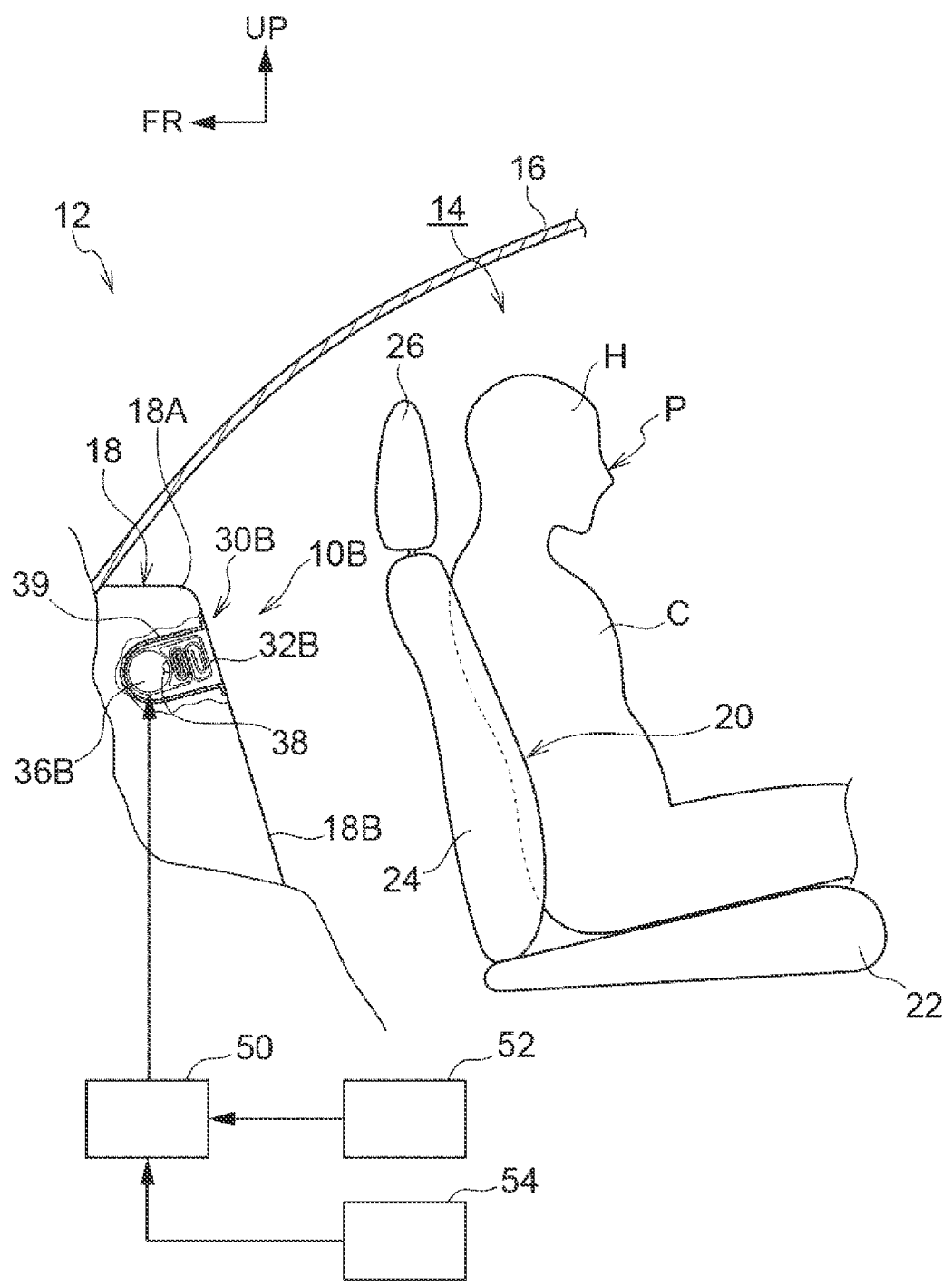
FIG. 8 is a side view of a vehicle and illustrates the arrangement of an occupant protection system according to a third embodiment.

The following describes the configuration of the third embodiment. As illustrated in FIG. 8, an airbag device 30B of the occupant protection system 10B of the present embodiment includes a rear airbag 32B, an inflator 36B, and the ECU 50.

Figure 9A:
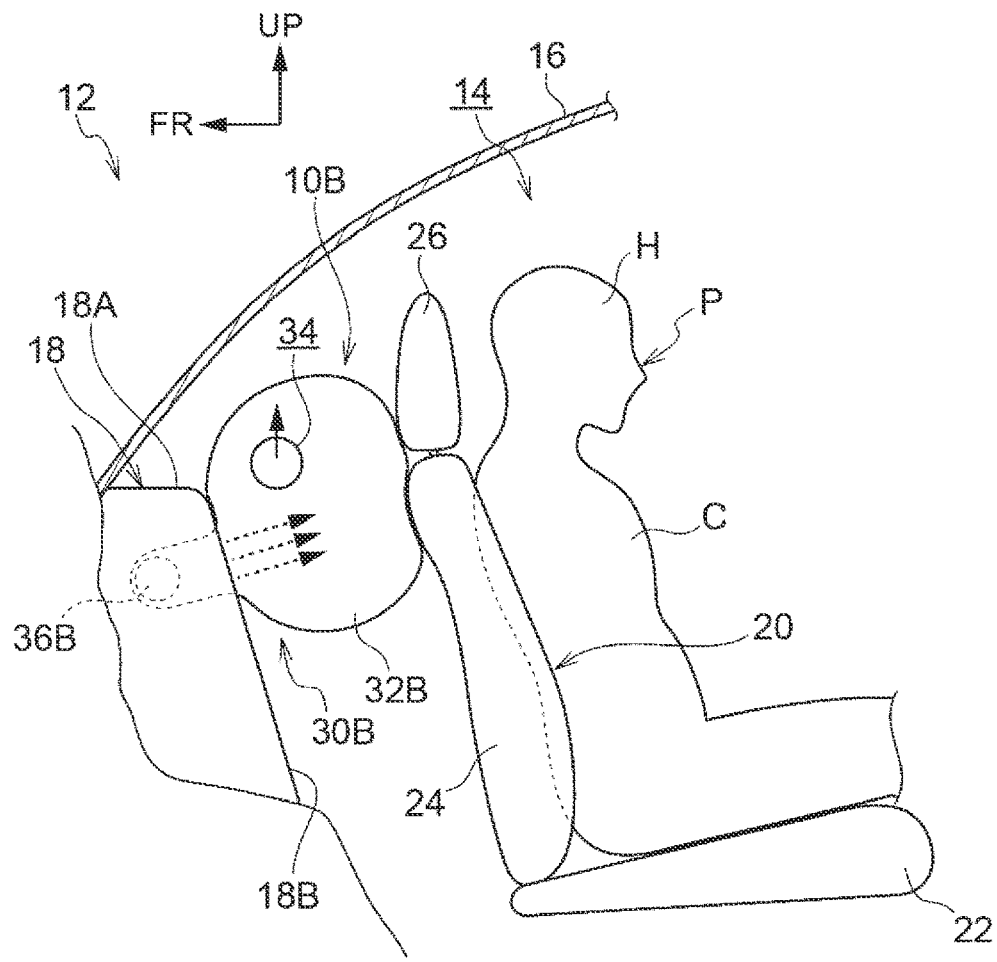
FIG. 9A is a side view of the vehicle in a state where the rear airbag is inflating and deploying in the occupant protection system according to the third embodiment.
Figure 10A:
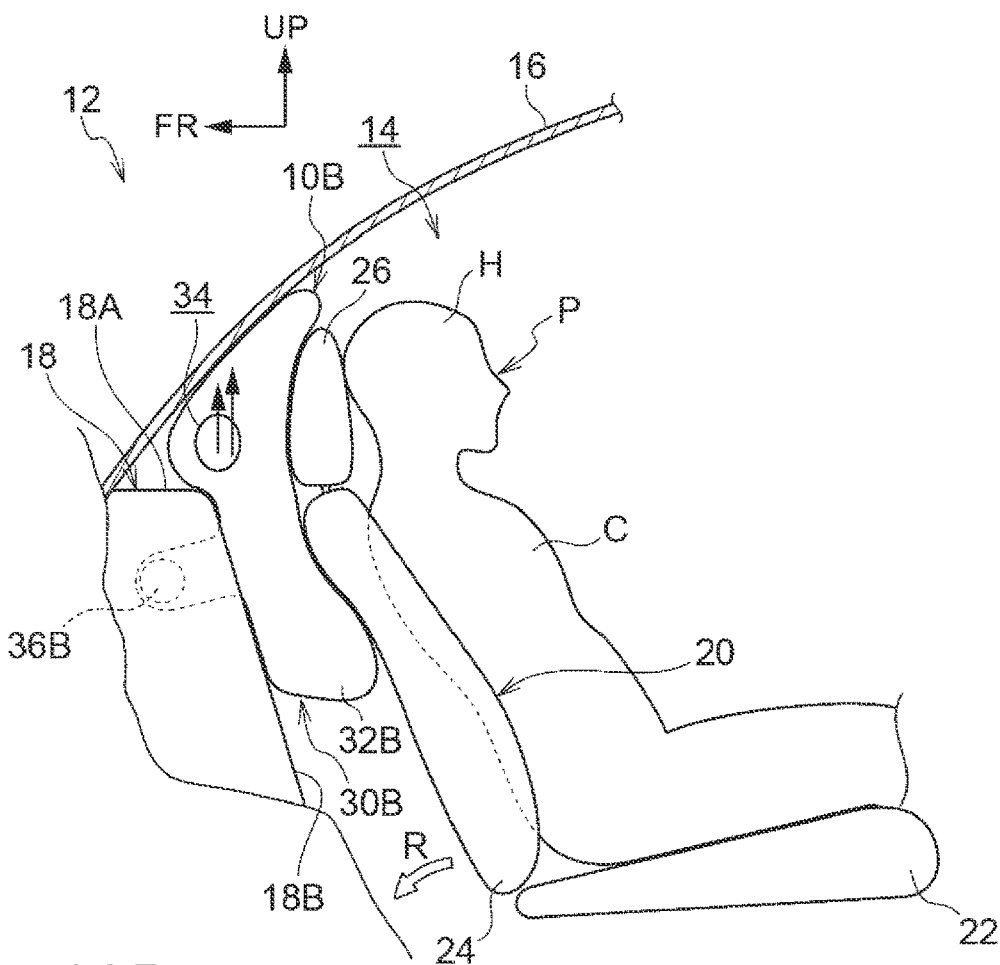
FIG. 10A is a side view of the vehicle in a state after the rear airbag has inflated and deployed in the occupant protection system according to the third embodiment.

As illustrated in FIGS. 9A and 10A, the rear airbag 32B of the present embodiment inflates and deploys between the rear wall portion 18B and the seatback 24. The rear airbag 32B is formed to have a bag shape by overlapping two sheets of base cloth made of a nylon or polyester fabric material, and sewing them together, for example. The rear airbag 32B inflates and deploys in an area in the seatback 24, the area corresponding to the chest C of the occupant P (see FIGS. 10A and 10B). Further, in a front view of the front seat 20, the rear airbag 32B inflates and deploys outwardly in the seat width direction from the seatback 24 and the headrest 26 at the time when the occupant P moves maximally (see FIG. 10B).

As illustrated in FIG. 8, the rear airbag 32B is folded before inflating and deploying and is stored in the dashboard 18, more specifically, in an airbag case 39 in the rear wall portion 18B together with the inflator 36B.

Further, the inflator 36B of the present embodiment is formed in a substantially cylindrical shape with its longitudinal direction extending along the seat width direction. The gas injection portion 38 including a plurality of holes is formed in the outer periphery of the inflator 36B. The inflator 36B is disposed inside the rear airbag 32B and is fixed inside the airbag case 39. Further, the ECU 50 is electrically connected to the inflator 36B. Further, the collision prediction sensor 52 and the collision sensor 54 are electrically connected to the ECU 50.

Next, the operation of the occupant protection system 10B of the present embodiment will be described.

As illustrated in FIG. 8, the rear airbag 32B before inflating and deploying is stored inside the rear wall portion 18B, and the seatback 24 is distanced from the dashboard 18.

Here, in a case where the collision prediction sensor 52 predicts a collision or in a case where the collision sensor 54 detects a collision, gas is emitted from the gas injection portion 38 in the inflator 36B.

As illustrated in FIG. 9A, the gas emitted from the gas injection portion 38 is supplied into the rear airbag 32B. The rear airbag 32B starting inflating pushes and opens an airbag door (not shown) provided in the rear side of the airbag case 39 in the vehicle front-rear direction in a side view and inflates and deploys toward the seatback 24. Then, the rear airbag 32B makes contact with the seatback 24.

Further, when the rear airbag 32B inflates and deploys, the vent hole 34 closed in the rear airbag 32B folded before inflating and deploying appears on the side face of the rear airbag 32B. The gas supplied into the rear airbag 32B is partially discharged via the vent hole 34, thereby restraining the internal pressure of the rear airbag 32B from becoming excessively large. This restrains an excessive load from being applied to the seatback 24 from the rear airbag 32B.

Figure 9B:
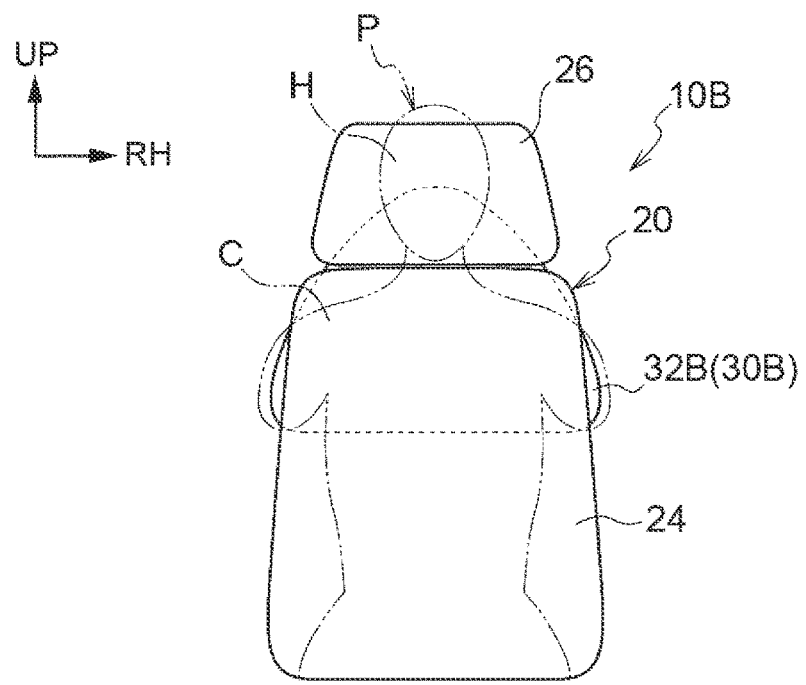
FIG. 9B is a front view of the front seat in the state where the rear airbag is inflating and deploying in the occupant protection system according to the third embodiment.

Further, as illustrated in FIG. 9B, the rear airbag 32B during inflating and deploying has a substantially triangular shape in a front view and falls within a range from the substantially center of the seatback 24 in the seat up-down direction to the substantially center of the headrest 26 in the seat up-down direction.

In the meantime, as illustrated in FIG. 10A, when the gas emitted from the gas injection portion 38 is continuously supplied into the rear airbag 32B, the rear airbag 32B further inflates and deploys. Further, the rear airbag 32B is compressed by the seatback 24 and the headrest 26 that pivot rearward (an arrow-R direction) in the seat front-rear direction upon receipt of a load from the occupant P. At this time, the lower side of the rear airbag 32B in the seat up-down direction is sandwiched between the seatback 24 and the rear wall portion 18B, and the upper side of the rear airbag 32B in the seat up-down direction is sandwiched between the headrest 26 and the windshield 16.

When the rear airbag 32B is compressed, the gas inside the rear airbag 32B is discharged moderately via the vent hole 34. This restrains an excessive load from being applied to the seatback 24 from the rear airbag 32B. Thus, in the present embodiment, the collision of the vehicle 12 is ended without applying an excessive load to the chest C of the occupant P.

Figure 10B:
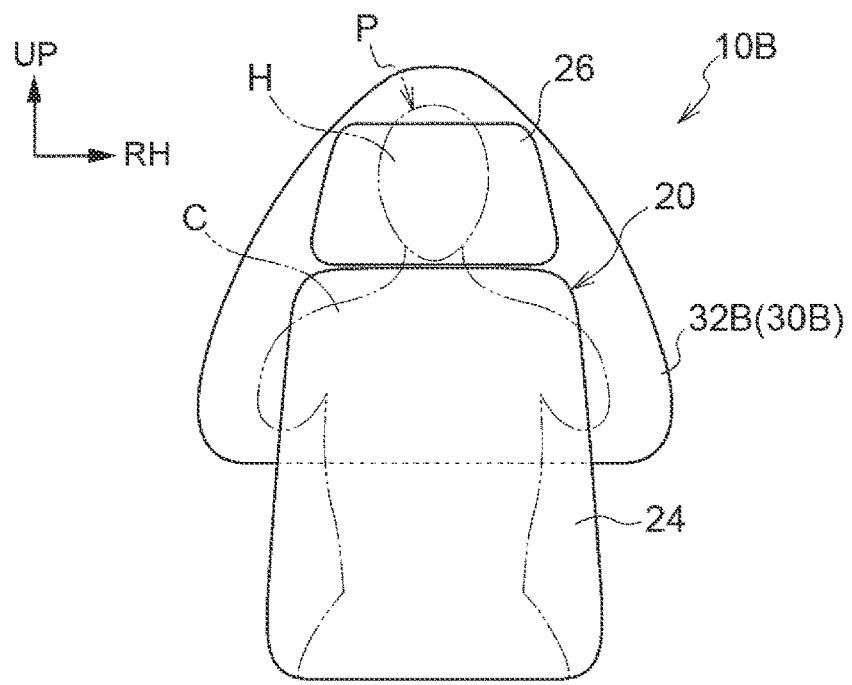
FIG. 10B is a front view of the front seat in the state after the rear airbag has inflated and deployed in the occupant protection system according to the third embodiment.

Further, as illustrated in FIG. 10B, the rear airbag 32B after inflating and deploying has a substantially triangular shape in a front view and covers a range from the substantially center of the seatback 24 in the seat up-down direction to the upper end portion of the headrest 26 in the seat up-down direction. Thus, in an area of the rear airbag 32B, which corresponds to the seatback 24, in other words, an area corresponding to the chest C of the occupant P, an outer part of the rear airbag 32B in the seat width direction protrudes from the seatback 24. Further, in an area of the rear airbag 32B, which corresponds to the headrest 26, in other words, an area corresponding to the head H of the occupant P, the outer part of the rear airbag 32B in the seat width direction and an upper part of the rear airbag 32B in the seat up-down direction protrude from the headrest 26.

Note that it is desirable that the rear airbag 32B of the present embodiment inflate and deploy in a wider range in the seat width direction than the rear airbag 32 of the first embodiment. This is to reliably support the seatback 24 that moves in the seat width direction in a case where the vehicle 12 has an oblique collision at the front side in the vehicle front-rear direction (i.e., an object (e.g., another vehicle) obliquely collides with the front side of the vehicle 12) and the seatback 24 moves obliquely rearward in the seat front-rear direction.

With the occupant protection system 10B of the present embodiment, it is possible to reduce an impact received by the occupant P, similarly to the occupant protection system 10 of the first embodiment, and further the following effects can be obtained. That is, in the present embodiment, since the airbag device 30B is provided on the dashboard 18-side (i.e., the airbag device 30B is provided in the dashboard 18), it is possible to reduce the weight of the front seat 20. This makes it possible to achieve a reduction in the weight of the vehicle 12 and further to reduce a load applied to the rear wall portion 18B of the dashboard 18 from the front seat 20.

The occupant protection systems 10, 10A, 10B of the embodiments are applied to the front seat 20 provided such that the occupant P faces rearward, but may be applied to a rear seat provided such that the occupant P faces forward. Note that, in this case, it is premised that a rear surface of the rear seat in the seat front-rear direction faces a partition panel (partition wall) and a rear windshield. An occupant protection system in this case can reduce an impact received by the occupant P seated in the rear seat when the vehicle 12 has a collision at the rear side in the vehicle front-rear direction (i.e., when an object (e.g., another vehicle) collides with the rear side of the vehicle 12).

In the disclosure, the embodiments can be combined appropriately. For example, the seat deployment portion 40 and the upper deployment portion 42 of the second embodiment may be applied to the rear airbag 32B of the third embodiment.

What is claimed is:

1. An occupant protection system comprising:
   a seat disposed such that a rear surface of a seatback in a seat front-rear direction faces a wall portion of a vehicle cabin;

an airbag provided in the wall portion or the seatback and configured to support the seatback by inflating and deploying between the wall portion and the seatback; and an inflator configured to generate gas to be supplied to the airbag in a case where a collision that causes an occupant seated in the seat to inertially move rearward in the seat front-rear direction is detected or predicted, wherein the airbag has a vent hole through which the gas inside the airbag is discharged outside, and the airbag includes:

a seat deployment portion configured to support the seat including the seatback;

an upper deployment portion connected to an upper side of the seat deployment portion in a seat up-down direction and having the vent hole, the upper deployment portion being configured to inflate and deploy in an area above a head of the occupant in the seat up-down direction;

a partition wall configured to separate the seat deployment portion from the upper deployment portion; and a check valve provided in the partition wall and configured to permit only a flow of the gas from the seat deployment portion to the upper deployment portion.

2. The occupant protection system according to claim 1, wherein the partition wall is provided so as to be disposed between the seat and a windshield at a time when the seat deployment portion inflates and deploys.

3. The occupant protection system according to claim 1, wherein the vent hole is provided on a side face of the upper deployment portion in a seat width direction so as to be disposed between the head and a windshield at a time when the occupant moves maximally.

4. The occupant protection system according to claim 1, wherein the inflator and the airbag before inflating and deploying are stored inside the wall portion.

5. An occupant protection system comprising:

a seat disposed such that a rear surface of a seatback in a seat front-rear direction faces a wall portion of a vehicle cabin;

an airbag provided in the seatback and configured to support the seatback by inflating and deploying between the wall portion and the seatback; and an inflator configured to generate gas to be supplied to the airbag in a case where a collision that causes an occupant seated in the seat to inertially move rearward in the seat front-rear direction is detected or predicted, wherein the airbag has a vent hole through which the gas inside the airbag is discharged outside, and the inflator and the airbag before inflating and deploying are stored inside the seatback.

6. The occupant protection system according to claim 5, wherein:

the airbag inflates and deploys in an area of the seatback, the area corresponding to a chest of the occupant; and the airbag inflates and deploys outwardly in a seat width direction beyond a headrest of the seat at a time when the occupant moves maximally.

7. The occupant protection system according to claim 5, wherein the vent hole is provided on a side face of the airbag in a seat width direction so as to be disposed between the seat and a windshield at a time when the occupant moves maximally.

8. The occupant protection system according to claim 5, wherein the seat is a vehicle front seat provided so that the occupant seated in the seat faces rearward relative to a vehicle front-rear direction, and the wall portion of the vehicle cabin is a rear wall portion of a vehicle dashboard disposed in a front side of the vehicle cabin.

9. The occupant protection system according to claim 8, wherein the dashboard includes (i) an upper wall portion extending toward a rear side of the vehicle cabin in the vehicle front-rear direction from a vicinity of a bottom end of a windshield that is disposed at the front side of the vehicle cabin, and (ii) a rear wall portion that is inclined downward in a vehicle up-down direction from a rear end of the upper wall portion in the vehicle front-rear direction.

* * * * *